United States Patent [19]
Uemura

[11] Patent Number: 6,056,884
[45] Date of Patent: May 2, 2000

[54] CONTINUOUS LIQUID PASTEURIZING APPARATUS AND A METHOD THEREFOR

[75] Inventor: Kunihiko Uemura, Ibaraki, Japan

[73] Assignee: Japan as Represented by Director of National Food Research Institute, Ministry of Agriculture, Forestry and Fisheries, Ibaraki, Japan

[21] Appl. No.: 09/062,090

[22] Filed: Apr. 17, 1998

[30] Foreign Application Priority Data

Nov. 25, 1997 [JP] Japan ...................................... 9-322633
Feb. 23, 1998 [JP] Japan .................................. 10-040133

[51] Int. Cl.$^7$ .................................................. B01D 17/06
[52] U.S. Cl. .......................... 210/748; 210/175; 210/243; 426/521; 99/451; 422/22
[58] Field of Search ............................ 426/521; 210/175, 210/748, 243; 99/451; 422/22

[56] References Cited

U.S. PATENT DOCUMENTS

| | | | |
|---|---|---|---|
| 3,878,103 | 4/1975 | Miller et al. ............................. | 210/243 |
| 4,917,782 | 4/1990 | Davies ..................................... | 210/748 |
| 5,185,086 | 2/1993 | Kaali et al. .............................. | 210/748 |
| 5,188,738 | 2/1993 | Kaali et al. .............................. | 210/748 |
| 5,480,558 | 1/1996 | El-Shoubary et al. .................. | 210/243 |

*Primary Examiner*—David A. Simmons
*Assistant Examiner*—Chester T. Barry
*Attorney, Agent, or Firm*—Carrier, Blackman & Associates, P.C.; Joseph P. Carrier; William D. Blackman

[57] ABSTRACT

Apparatus for continuously pasteurizing liquid by continuously flowing the liquid within a high electric field, comprises a body of electrical insulator material forming a wall, opening portions formed in the wall body as passages for the liquid therethrough, at least a pair of electrode wires laid across the opening portions, and a mechanism for applying an alternating current voltage across the pair of electrode wires. Joints and pipes may be connected to the wall body and together with the opening portions define a fluid passage through which the liquid continuously flows for being pasteurized. A method of continuous liquid pasteurization using the apparatus involves applying an alternating current voltage between the pair of electrode wires under the conditions of $2000 \leq H/d \leq 200$ where d (mm) is the distance between the wires and H (volt) is the voltage applied thereacross, and such that the liquid is heated.

19 Claims, 10 Drawing Sheets

CONTINUOUS LIQUID PASTEURIZING APPARATUS AND A METHOD THEREFOR

BACKGROUND OF THE INVENTION

1. Field of the Invention

The present invention relates to a liquid pasteurizing apparatus and a method therefor for pasteurizing liquid, such as water for drinking, beverages such as juice or beer and water for industrial use, and in particular, to a continuous pasteurizing apparatus and a method therefor that is able to continuously pasteurize the liquid which is supplied continuously.

2. Description of Related Art

Conventionally, various methods for disinfecting or pasteurizing liquid, such as drinking water, are known and have been applied, including boiling the water by heating thereof, and putting a disinfectant or germicide into the water. Among these methods of disinfecting or pasteurization, as one pasteurizing method for liquid that uses electricity, there is already known a method that utilizes high voltage pulses. In this method, the water, i.e., the liquid to be treated or processed, is introduced into a vessel or container in which a pair of electrodes are provided, and the high voltage pulses are applied thereacross so as to pasteurize the water with the high electric field caused thereby.

Further, in an another method using electric fields for the pasteurizing or disinfecting of liquid or water, for example, as shown in FIG. 14 attached hereto, water to be processed is introduced into a vessel or container and a coil made of titanium is dipped into it. Then, an alternating current voltage (for example, a commercial power source of 200 V) is applied thereto, while the water in the vessel is stirred by a stirrer.

However, in the known pasteurizing or disinfecting methods mentioned above, since the water to be treated is first introduced into the vessel or container once, they cannot be therefore considered continuous pasteurizing methods for processing water continuously, and they have low efficiency. Further, the conventional methods necessitate a sufficient number of electrical pulses for pasteurizing the water completely, therefore it takes a long time for the processing. As a result of this, in accordance with the conventional methods mentioned above, it is impossible to insure or obtain a sufficient amount of treated or processed water therewith.

SUMMARY OF THE INVENTION

Therefore, an object in accordance with the present invention, for overcoming the drawbacks of the conventional methods mentioned above, is to provide a continuous liquid pasteurizing apparatus and a method therefor, by which continuous pasteurization of liquid is possible, thereby achieving a continuous supply of a sufficient amount of processed liquid or water with safety and without delay.

For overcoming the conventional drawbacks mentioned above, in accordance with the present invention, there is provided a continuous liquid pasteurizing apparatus for pasteurizing liquid by flowing the liquid within a high electric field continuously, comprising:

a body of electric insulator material forming a wall;
  opening portions formed in said wall body for forming a part for passage of the liquid therethrough;
  at least a pair of electrode wires which are provided across said opening portions; and
  means for applying an alternating current voltage across said pair of electrode wires.

In addition, in accordance with the present invention, the wall body can be freely formed in any shape, including a plate-like shape and a cylindrical shape. Further, pipes can be connected on one side surface and on the other side surface of said opening portion formed in the wall body so as to form the passage for the liquid. However, a construction without connecting such pipes is also within the scope of the present invention.

Further, the temperature of the liquid is increased during the pasteurization process when it has a high electrical conductivity because of increase of heat generation by the ohmic heating, and therefore the method is inappropriate for low temperature pasteurization. In such a case, since a construction is conceivable in which a portion to which the electricity is applied is dipped in a cooling vessel or container during processing, it is, therefore, preferable to form the wall body in the cylindrical shape and to wind the electrode wires thereon spirally.

Here, in the case where the wall body is formed in the cylindrical shape, it is possible to expose the electrode wires only in the opening portions, by forming an insulating film on the cylindrical wall body where the remaining opening portions are formed thereon after winding the electrode wires around it.

Further, in the case where the wall body is formed in the cylindrical shape, by connecting a pipe forming a part of the liquid passage on one side surface and the other side surface of the opening portion, it is possible to form each liquid passage with a pipe and an opening.

Moreover, in a continuous liquid pasteurizing method using the continuous liquid pasteurizing apparatus, of the present invention, the liquid is pasteurized under a condition of $2000 \geq H/d \geq 200$, or more preferably $1600 \geq H/d \geq 400$, where d (mm) is the distance between said pair of electrode wires and H (volt) is the voltage applied thereacross.

Sufficient pasteurizing effect cannot be obtained if H/d is less than 200 (volt/mm), while it is conceivable that the higher the voltage applied, the more effective the pasteurization. However, the temperature of the liquid, such as, for example, beer, is increased if it is pasteurized under a H/d ratio of greater than 2,000 (volt/mm).

With the frequency to be applied thereto, it can be predicted that the lower the frequency is, the higher the pasteurizing effect thereof. However, it should be less than 50 kHz. However, if the frequency is low, in particular, less than 50 Hz, supply of the electricity is not stable because of sparking, corrosion of the electrodes by electrolysis or electrolysis of the solution. Therefore, it is appropriate that it is around 20 kHz.

Further, the pasteurizing effect can be obtained with a lower voltage if the distance between the electrodes is as narrow as possible. However, it is appropriate that it is less than 1 mm, in particular, around 0.25 mm if possible, by taking accuracy in the minute processing thereof into consideration. If the distance between the electrodes is too narrow, however, the opening area becomes constricting. Therefore, it becomes impossible to obtain enough amount of liquid processing, as well as it applies a stricter condition such that the liquid to be processed must be low in a coefficient of viscosity and can not contain stuffs blocking or choking it.

Further, the flow rate of the liquid is also an important parameter, for instance, if using a pipe of 4 mm in diameter, the rate should be about 150 ml/min.

If the electric resistance of the liquid to be pasteurized is too low, since it is impossible to apply a necessary voltage thereacross, the pasteurizing effect is decreased. Therefore, it is preferable for the liquid to be pasteurized to have an electric resistance higher than a certain value.

Moreover, with the pasteurizing temperature, of course the effectiveness of the treatment temperature is dependent on the kinds of bacteria in the liquid. It can be affirmed that, in particular, colon bacillus are pasteurized very effectively by multiplication of the effects with the electric field and the heating.

DESCRIPTION OF THE PREFERRED EMBODIMENTS

Figure 1:
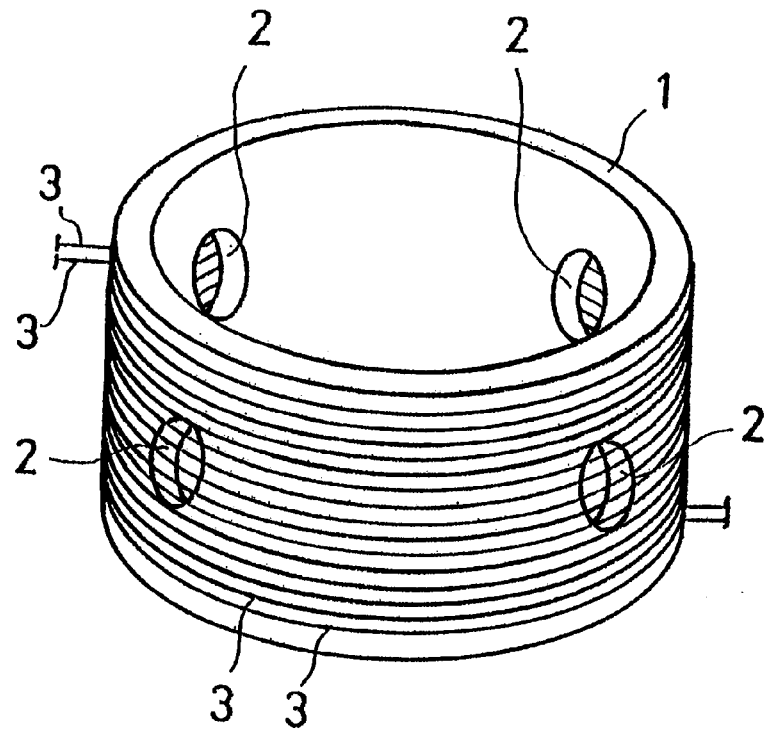
FIG. 1 is a perspective view showing a cylindrical body, in accordance with the present invention, around a peripheral surface of which wires for forming electrodes are wound.
Figure 2:
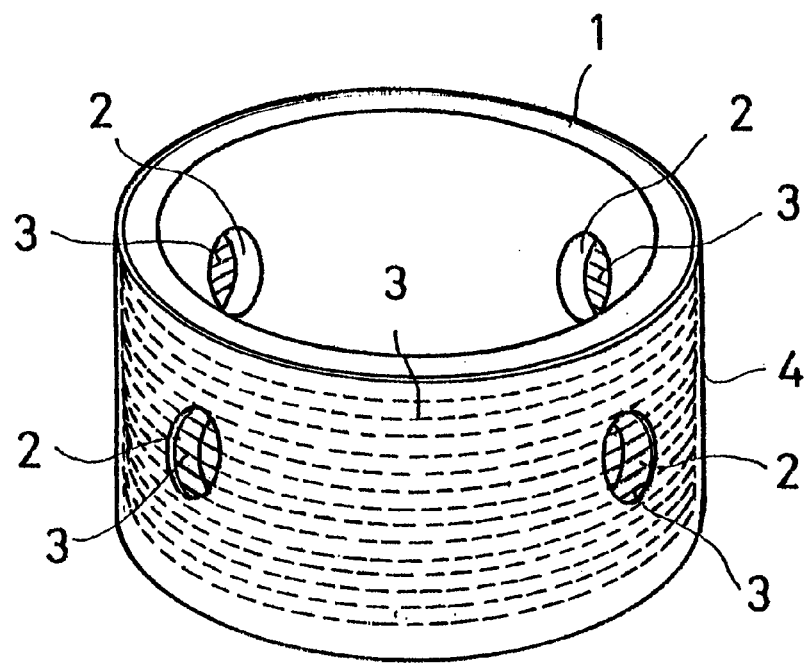
FIG. 2 is a perspective view showing the cylindrical body, around the peripheral surface of which insulation is formed.
Figure 3:
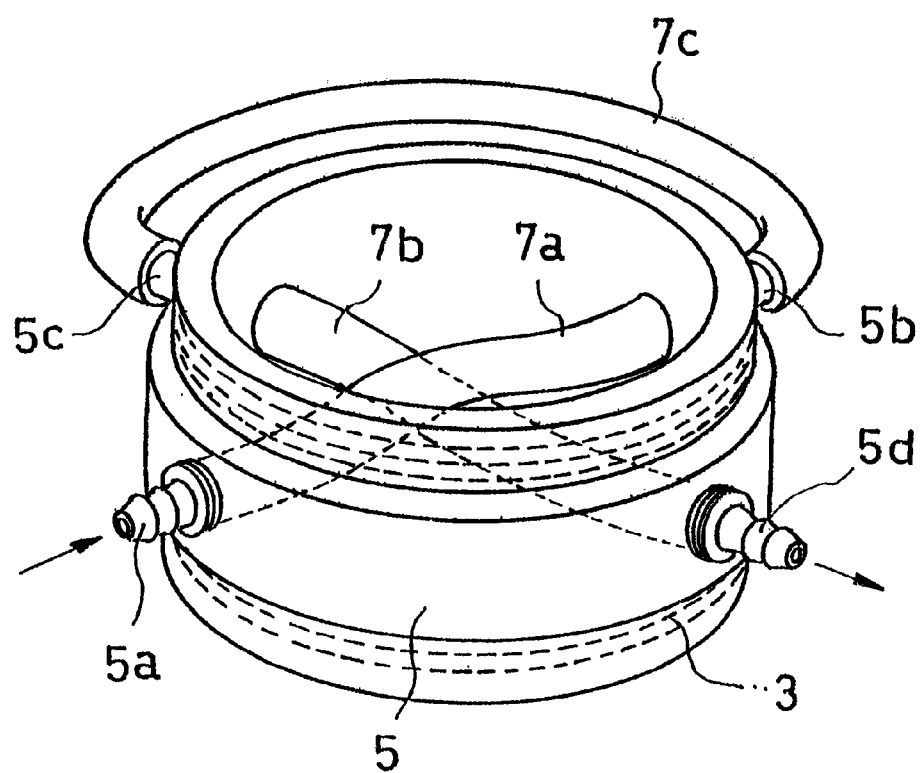
FIG. 3 is a perspective view showing a continuous liquid pasteurizing apparatus in accordance with the present invention.

Hereinafter, detailed explanation of the preferred embodiments according to the present invention will be given by referring to the attached drawings. FIGS. 1 to 3 show manufacturing processes of making a continuous liquid pasteurizing apparatus in accordance with the present invention, and first of all, as shown in FIG. 1, on the outer surface of a cylindrical wall body 1 comprising electric insulating material there are formed four (4) opening portions 2,2 . . . at equal circumferential distances.

Figure 5:
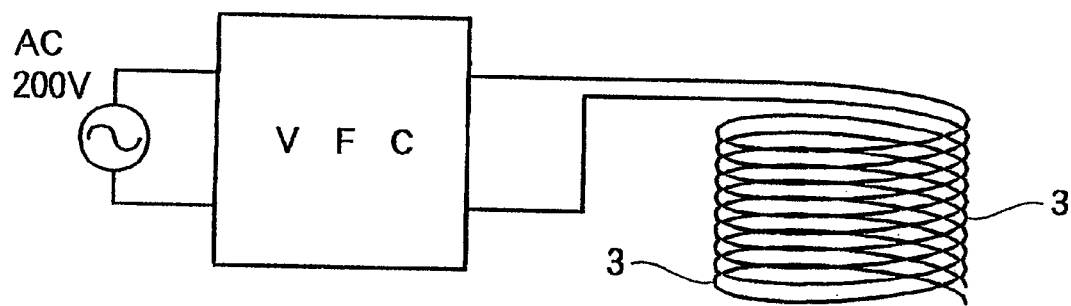
FIG. 5 is an electrical circuit diagram showing the construction of the electrodes of the continuous liquid pasteurizing apparatus.

Next, in a spiral-shaped gutter formed on the peripheral surface of the cylindrical wall body 1, a pair of electrodes 3,3 of titanium, having a diameter of about 0.25 mm, are fitted and wound. The electrodes 3,3, as shown in FIG. 5, are connected to an alternating current voltage source, and those electrodes 3,3, as a unit, are aligned parallel to each other with a gap of 0.25 mm between them, and are wound in a large number of turns.

After this, as shown in FIG. 2, electric insulating material, such as silicon, is painted on the electrodes 3,3 so as to form an insulating layer 4 on the surface thereof. At this time, however, the electric insulating material is not painted on the opening portions 2. As a result of this, as shown in the figure, those electrodes 3,3 are stretched tightly crossing over the opening portions 2 without a coating of the insulating material.

Figure 4:
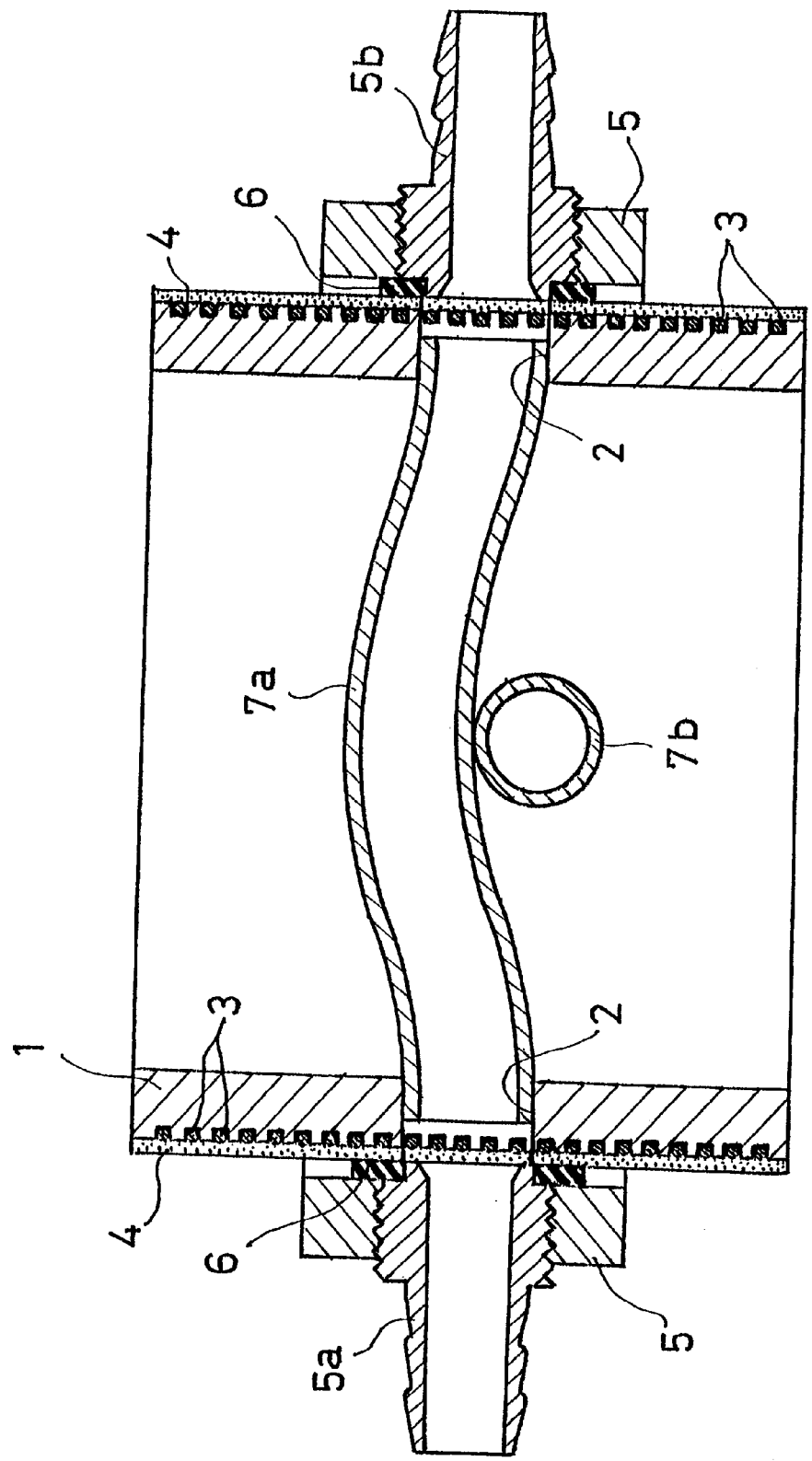
FIG. 4 is an enlarged sectional view of a part of the continuous liquid pasteurizing apparatus.

After this, as shown in FIGS. 3 and 4, holding rings 5 are fixed on the external peripheral surface of the cylindrical wall body 1. Though various methods can be applied optionally for the fixing thereof, in the present invention the holding rings 5 are so fixed that joints 5a, 5b, 5c, and 5d comprising polycarbonate which are attached to the holding rings 5 at equal distances are aligned with the respective opening portions 2.

Then, at an inner side of the holding rings 5, portions of joints 5a, 5b, 5c, and 5d are projected, while at the outer side thereof there is provided respective packing portions 6. Therefore, under the condition that holding rings 5 are fixed at the peripheral external surface of the cylindrical wall body 1, the opening portions 2 communicate with the inside bore of those joints. In the embodiment shown in the figure, the diameter of the inside bore is set to be nearly equal to that of the opening portion 2, however, the diameter can also be set at about two times larger than that of the opening portion 2 so as to absorb any gap or shift in between them in positions thereof.

Further, as shown in the figure, on the cylindrical wall body 1 respective pairs of those opening portions 2, which are opposed to each other, are connected with respective flexible tubes 7a and 7b in the inside of the cylindrical wall body 1. Further, those joints 5b and 5c are connected with another flexible tube 7c at the outside thereof.

With such connection of the tubes, the liquid, which is pressurized by, for example, a pump and flows in from the joint 5a, passes through the flexible tube 7a, the joint 5b, the flexible tube 7c, the joint 5c and the flexible tube 7b and is discharged from the joint 5d. And, during this, the liquid passes four (4) times through the opening portions 2 over which the electrodes 3 are stretched.

Figure 6:
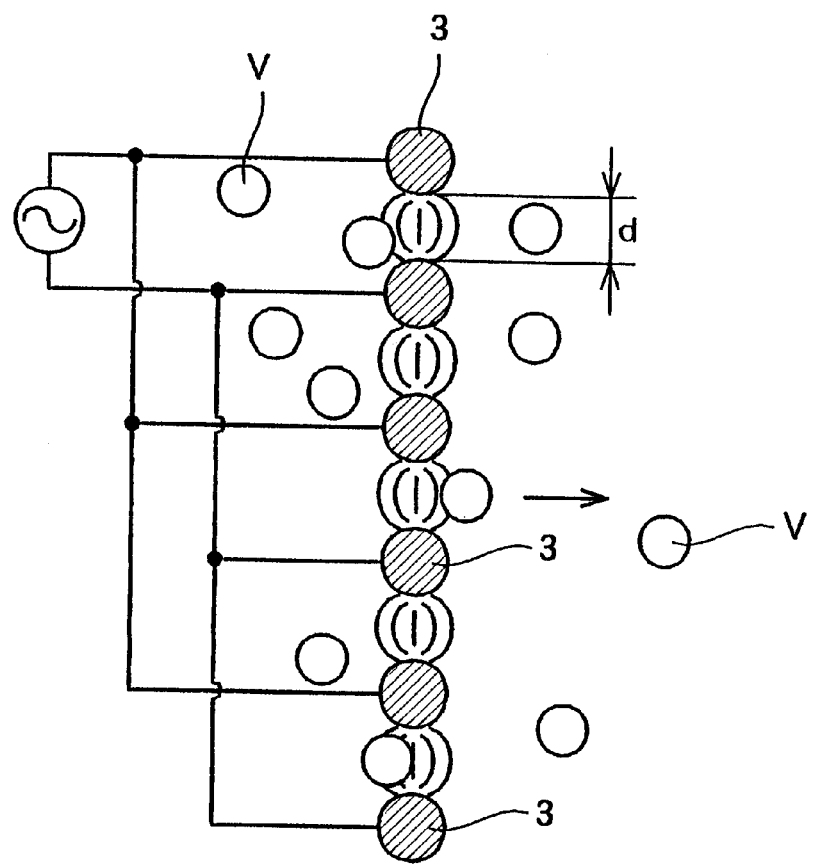
FIG. 6 is an explanatory drawing of the functioning of the pasteurization process at an opening portion of the continuous liquid pasteurizing apparatus.

Namely, while simultaneously applying an alternating current voltage to the pair of the electrodes 3,3, the liquid to be processed is continuously supplied in the direction of the arrow in FIG. 3 through the joint 5a. With this, the liquid to be processed passes through the high electric field produced between the electrodes 3,3 at the opening portions 2. As shown in FIG. 6, bacteria V (in the figure, the bacteria are shown enlarged in size for easy understanding), such as the colon bacillus and so on, in the liquid are continuously pasteurized by the effect of the electric field produced across the electrodes 3,3 when the liquid passes by the electrodes 3,3 when flowing through the opening portions 2. The pasteurizing mechanism of cells under an electric field is already well-known in the art, and therefore explanation thereof will be omitted here.

Further, the voltage applied across the pair of electrodes 3,3 can be changed depending on the distance "d" between them, and thereby, it is possible to set the alternating current voltage at a relatively low value thereof, which is applied across the electrodes 3,3 from an external source. Furthermore, it is preferable to use an alternating current voltage to be applied across the electrodes 3,3 which has a frequency higher than that of an ordinary commercial power source. Namely, by using such a higher frequency AC voltage source it is possible to reduce electrolysis which occurs on the surface of the electrodes 3,3, thereby improving the endurance or durability of the apparatus as well as reducing any harmful influence on the liquid or water to be processed. For instance, as shown in FIG. 5, a voltage source of 200 VAC from a commercial power source is converted by a frequency-voltage converter (FVC) into the any appropriate voltage of any suitable frequency to be supplied across the pair of electrodes 3,3.

Figure 8:
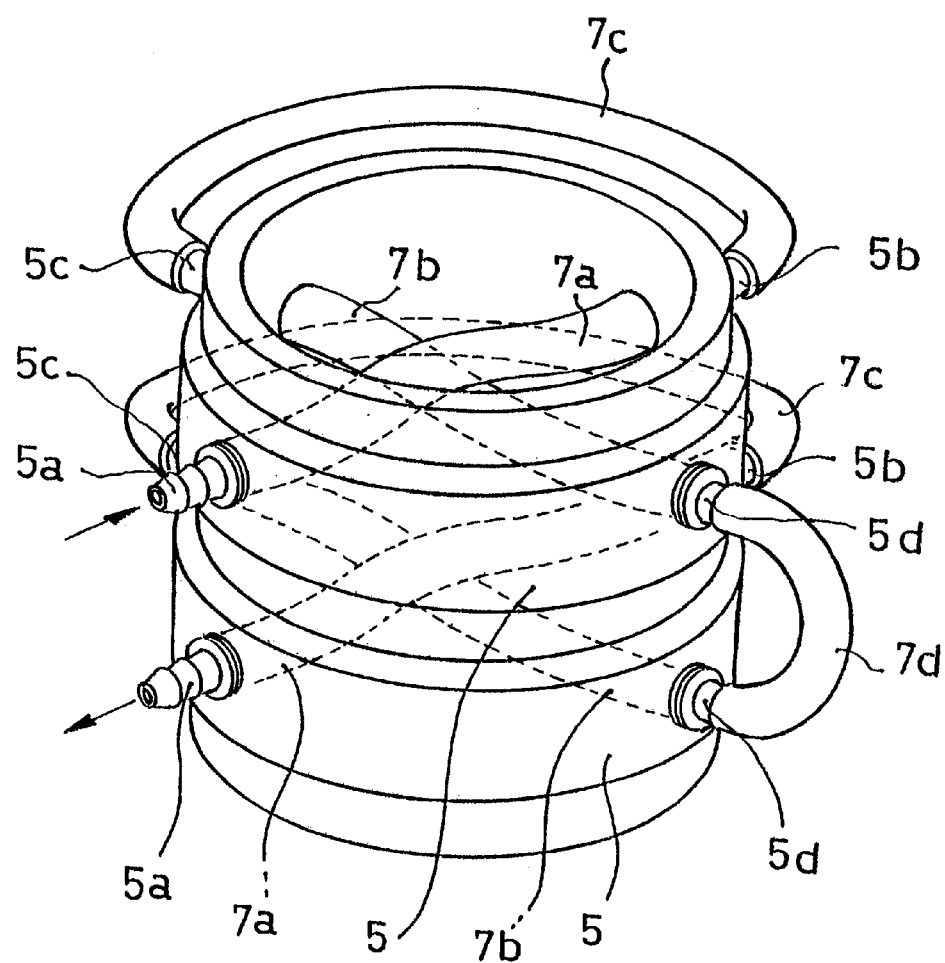
FIG. 8 is a perspective view showing an another continuous liquid pasteurizing apparatus in accordance with the present invention.

FIG. 8 shows a perspective view of a continuous liquid pasteurizing apparatus of another embodiment of the present invention. In this embodiment, two sets of the four (4) opening portions 2 are formed in the cylindrical wall body 1 separately in concentric up and down portions, thereby totally eight (8) opening portions 2 are formed therein. According to this configuration, by fixing holding rings 5 in two stages and further by connecting the flexible tubes 7d between the joints 5d of the holding rings 5 in two stages, a upper passage is formed in which the liquid to be processed flows into the joint 5a of the lower stage and flows out from joint 5a of the lower stage.

And, in the present embodiment, the liquid to be processed passes through the opening portions 2 totally 8 times while it flows in the passages mentioned above. In other words, the pasteurization is repeated eight(8) times.

Although only two embodiments of the present invention are shown above, the continuous liquid pasteurizing apparatus of the present invention is not limited to that of the structure shown in the figures but may be modified in various ways without departing from the gist, spirit or essence of the invention. For example, the shape of the wall body is not limited only to the cylindrical one, but can also be formed in a cubic shape a plate-like shape, etc.

Furthermore, without attaching the pipes at the opening portions of the wall body, it is also possible to discharge the liquid to be processed directly from the opening portion(s). In other words, it is also possible to configure the apparatus such that the end portions of the upper and lower stages of the cylindrical wall body are closed, and that the liquid to be processed, which is sent into the inside of the cylindrical wall body by the pump and so on, is pasteurized at the opening portions and then discharged to the outside.

Figure 7:
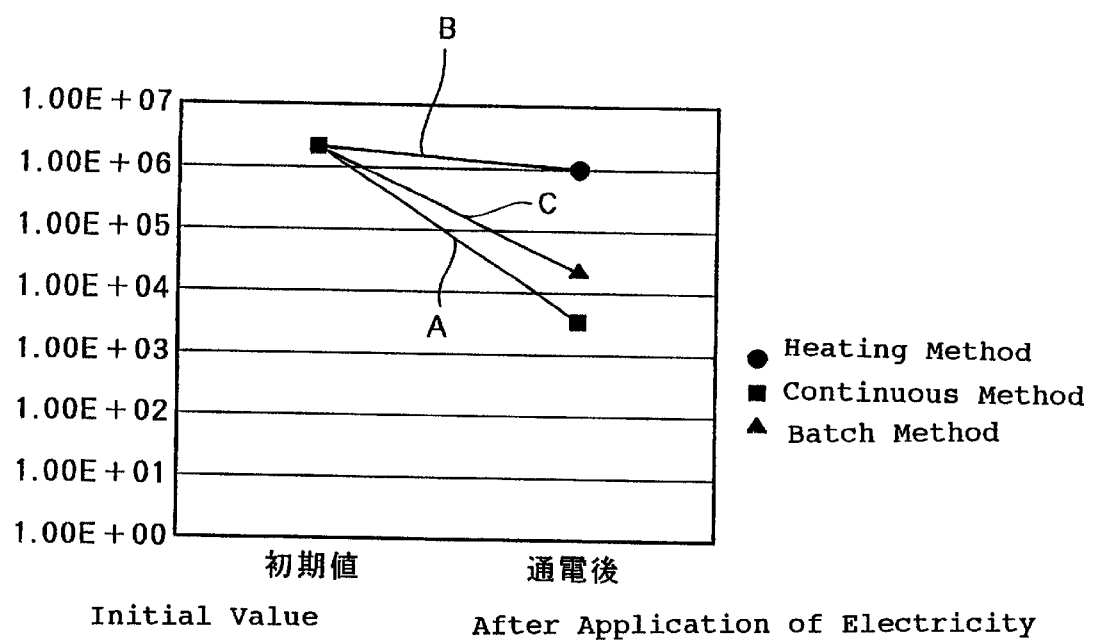
FIG. 7 shows a graph depicting an effect of the pasteurization with the continuous liquid pasteurizing apparatus of the present invention.

A result of pasteurizing the liquid or water by the pasteurizing apparatus mentioned in the above is shown on the graph in FIG. 7. In the graph, the vertical axis shows the number of bacteria in the processed liquid. As is apparent from the characteristic curve A in this graph, in the case where the pasteurizing is conducted by using the pasteurizing apparatus in accordance with the present invention, the number of bacteria in the water (here, thin salt water a concentration of 0.05% is used to approximate actual drinking water) is greatly reduced after supplying the electricity to the electrodes and pumping the water through the apparatus. In this graph, for further comparison, the number of bacteria in a sample of water which was heated (at 65° C. for 30 sec.) in accordance with the prior art is shown by the characteristic curve B, and that of bacteria in a sample of water which was pasteurized by the batch process mentioned in the above prior art is shown by the characteristic curve C.

Comparing to those two characteristic curves, it is evident that the effect of pasteurizing the bacteria using the method and apparatus of the present invention is clearly improved.

Still, although the temperature of liquid is also increased up to about 65° C. just after the pasteurizing process by applying electricity in accordance with the present invention, since it is actually cooled by iced water immediately thereafter, the time period during which the liquid rises up to 65° C. is a short time, less than two (2) seconds.

Further, though such effective or sufficient pasteurizing effect cannot be obtained with the conventional pasteurizing method of heating the liquid up to 65° C. only for two (2) seconds, it is apparent that the pasteurizing effect is improved greatly by applying the voltage of the present invention thereto.

Further, with additional experiments or tests, for effectively obtaining the pasteurizing effect by applying the alternating current electric field, it becomes clear that the temperature of the liquid to be processed should be higher than a certain value, preferably.

Figure 9:
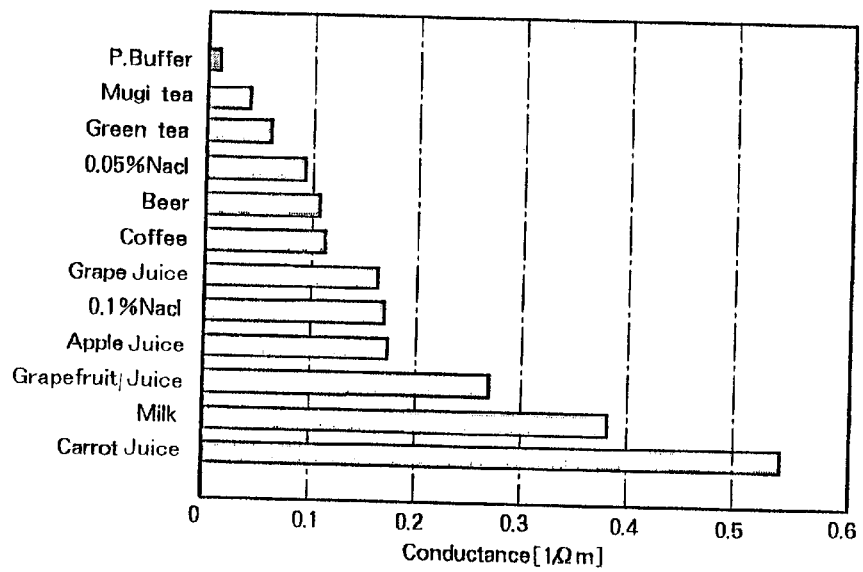
FIG. 9 is a graph of showing conductance values of various kinds of liquids at a temperature of 10° C. and at a frequency of 10 kHz.
Figure 10:
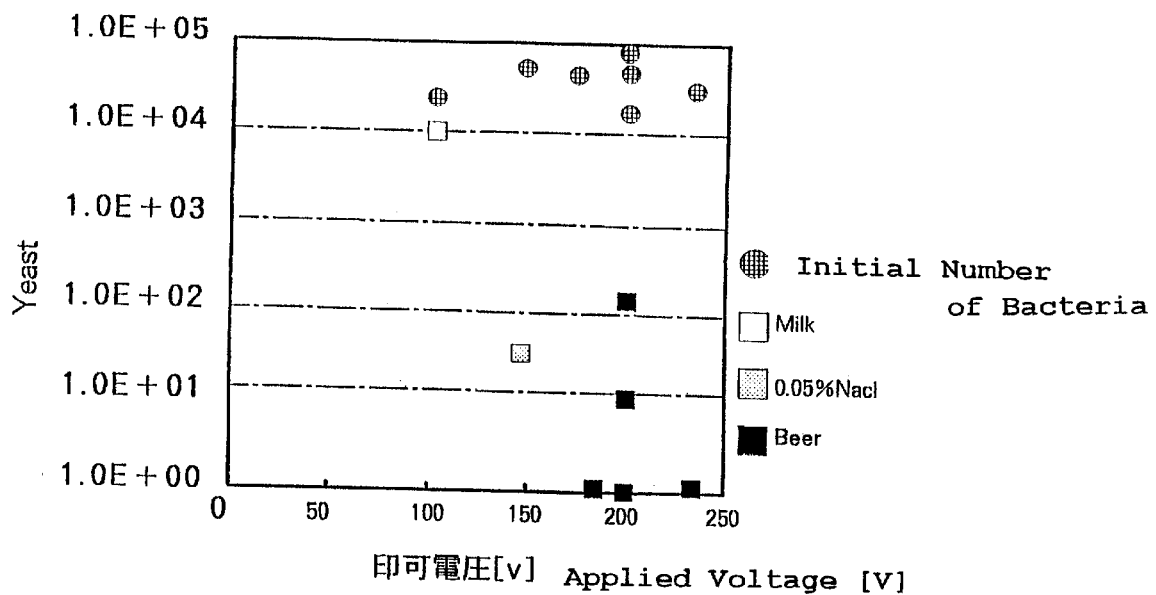
FIG. 10 is a graph of showing a relationship between the applied voltage and the change of numbers of bacteria before and after the pasteurizing process, selecting, in particular, milk, water solution of salt and beer.

FIG. 9 is a graph showing electric conductance of various kinds of liquids to be processed at frequency of 10 kHz, and FIG. 10 and Table 1 show changes in bacteria before and after the processing, in particular, selecting milk, a thin salt water of concentration of 0.05% (i.e., water solution of 0.05% NaCl) and beer as the liquids to be processed.

TABLE 1

| Voltage [V] | Solvent | Temp. [° C.] of Liquid | Processing Temp. [° C.] | Number of Bacteria Before Processing | Number of Bacteria After Processing |
|---|---|---|---|---|---|
| 153 | 0.05% NaCl | 20 | 48 | 5.00E + 04 | 30 |
| 180 | 0.05% NaCl | 16.2 | 54 | 4.20E + 04 | 0 |
| 200 | 0.05% NaCl | 5.3 | 41 | 2.00E + 04 | 0 |
| 200 | 0.05% NaCl | 5.5 | 48 | 5.00E + 04 | 0 |
| 200 | Beer | 7.5 | 30 | 7.80E + 04 | 1.20E + 02 |
| 200 | Beer | 6.6 | 49 | 7.80E + 04 | 7 |
| 230 | Beer | 6.2 | 48.5 | 3.30E + 04 | 0 |
| 97.5 | Milk | 13 | 26.1 | 2.00E + 04 | 1.10E + 04 |

As apparent from FIGS. 9 and 10 and the above Table 1, it is impossible to reduce the number of bacteria in the milk having high electric conductance value, since it is difficult to apply the alternating current voltage higher than 100 V to it. However, with the water solution of 0.05% salt and the beer, both having relatively low electric conductance, the method of the present invention is very effective, i.e., when applying the voltage higher than 180 V to the water solution of 0.05% salt and at the processing temperature of 54° C., the number of bacteria becomes zero (0), and when applying the voltage higher than 230 V and at the processing temperature of 49° C., the number of bacteria in the beer becomes zero (0).

Next, the change or relationship between the applied voltage and the bacteria number at a target of colon bacillus is searched. The result is shown in FIG. 11 and a Table 2.

TABLE 2

| Voltage [V] | Temp. [° C.] of Liquid | Processing Temp. [° C.] | Number of Bacteria Before Processing | Number of Bacteria After Processing |
|---|---|---|---|---|
| 100 |    | 61   | 1.30E + 06 | 9.60E + 05 |
| 120 | 43 | 63   | 3.80E + 06 | 3.90E + 05 |
| 130 |    | 60.8 | 1.30E + 06 | 3.30E + 05 |
| 135 |    | 67.8 | 2.50E + 06 | 2.30E + 04 |
| 150 |    | 58   | 3.50E + 06 | 1.80E + 05 |
| 150 |    | 65.5 | 2.80E + 06 | 2.70E + 03 |
| 180 |    | 62   | 2.30E + 06 | 5.00E + 03 |
| 180 | 21 | 64   | 3.80E + 06 | 1.10E + 04 |
| 200 |    | 56   | 2.70E + 06 | 3.60E + 04 |
| 200 | 6.23 | 61 | 2.30E + 06 | 8.80E + 02 |
| 200 |    | 61   | 3.00E + 06 | 1.10E + 04 |
| 200 | 10.5 | 62 | 3.80E + 06 | 1.50E + 04 |
| 200 | 7.8  | 63.4 | 2.30E + 06 | 1.70E + 04 |
| 200 | 10.2 | 71 | 2.10E + 06 | 0 |
| 200 | 16.3 | 71.5 | 2.10E + 06 | 5 |
| 200 |    | 72   | 2.30E + 06 | 0 |
| 210 |    | 61   | 1.30E + 06 | 8.40E + 04 |
| 230 |    | 70   | 3.30E + 06 | 23 |

Figure 11:
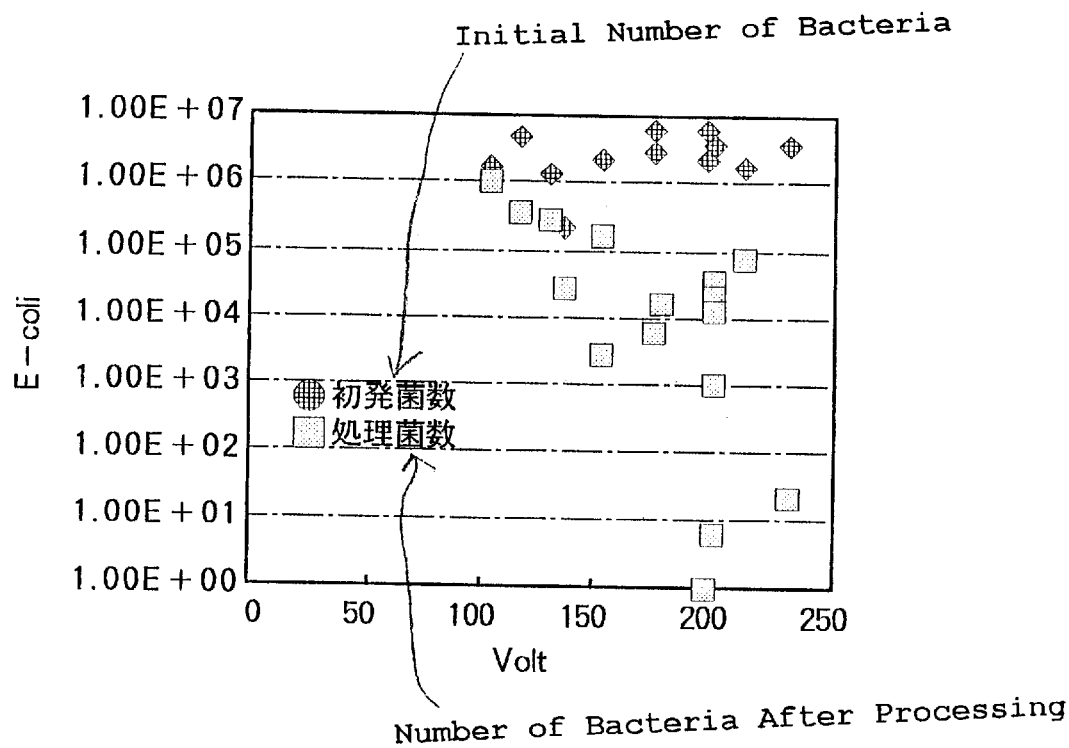
FIG. 11 is a graph of showing a relationship between the applied voltage and the number of bacteria, in particular, colon bacillus, as the result of examination thereof.

As apparent from FIG. 11 and the Table 2, the higher the voltage, the greater the pasteurizing effect, and in particular, the colon bacillus are drastically pasteurized with the voltage higher than 200 V.

Further, the change or relationship between the processing temperature and the bacteria number is searched under the condition that the applied voltage is constant (at 200 V). The result is shown in FIG. 12.

Figure 12:
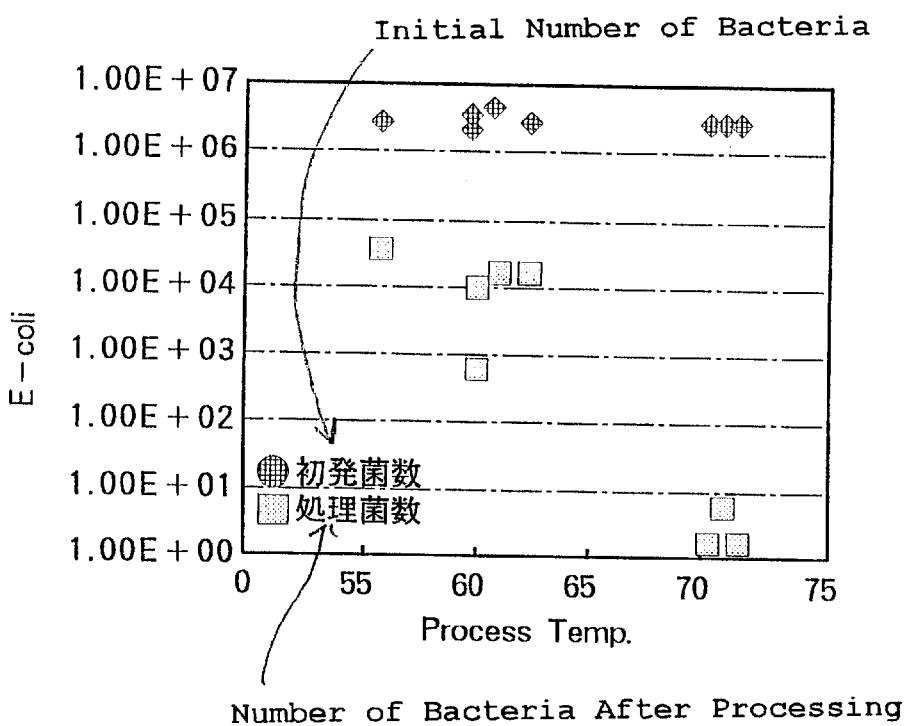
FIG. 12 is a graph of showing a relationship between the processing temperature and the number of bacterial applying with a constant voltage (200 V)

As apparent from FIG. 12, the pasteurization effect by application of the electric field, in particular with the colon bacillus, is high where the processing temperature exceeds 65–70° C.

Figure 13:
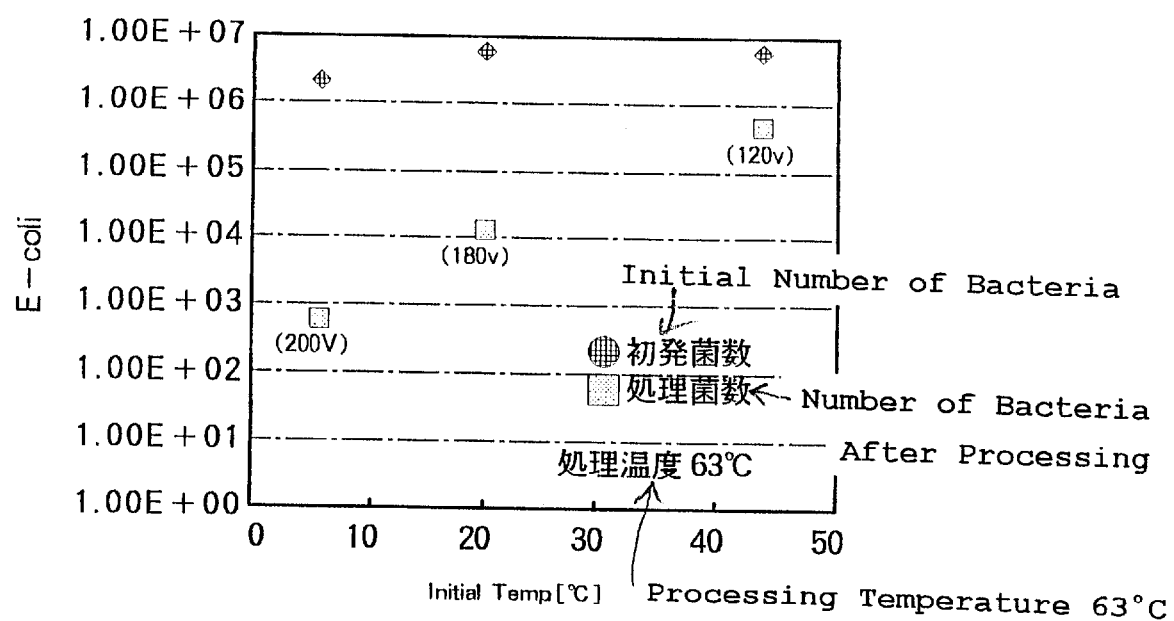
FIG. 13 is a graph of showing a change of the number of the bacteria when varying the applied voltage at the same processing temperature.
Figure 14:
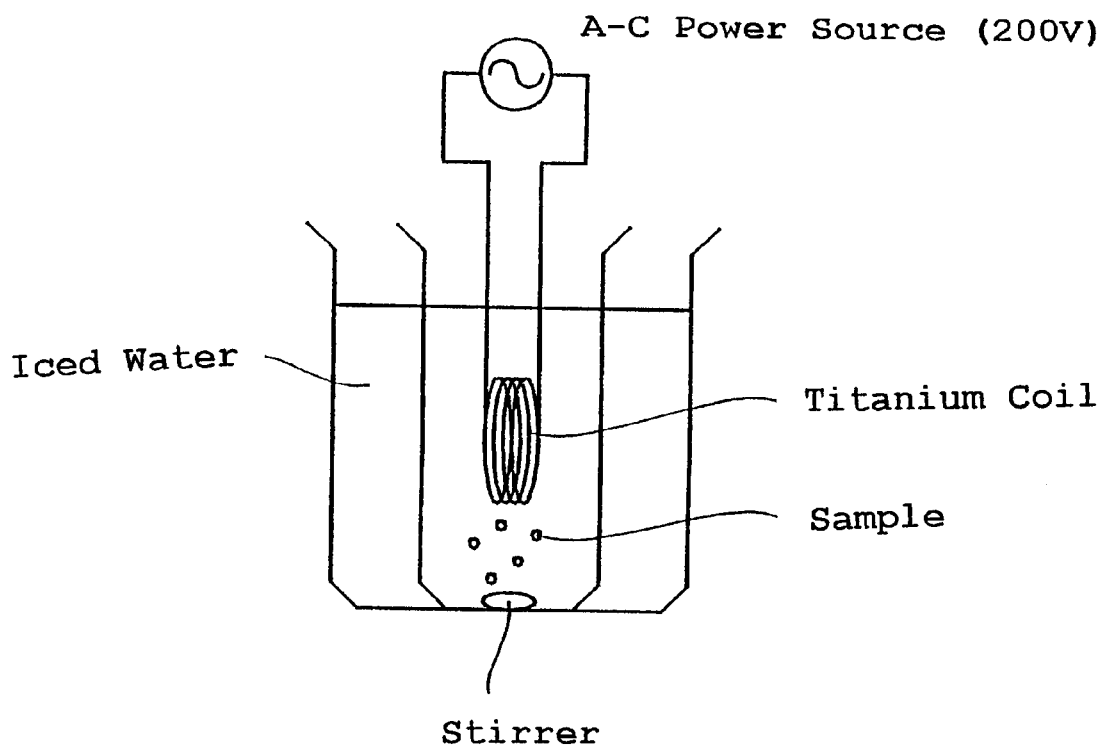
FIG. 14 shows an example of a conventional pasteurizing apparatus using an electric field in accordance with the prior art.

Furthermore, the change in the number of bacteria, caused by changing the temperature of the solution and applying a voltage that the temperature after processing is always the same, is shown in FIG. 13.

As is apparent from this FIG. 13, even at the same final processing temperature, the higher the applied voltage, the higher the pasteurizing effect. Namely, by combining the pasteurization caused by the electric field and that caused by heating, it is possible to kill the bacteria in a short time.

As is fully explained above, the continuous liquid pasteurizing apparatus in accordance with the present invention can be manufactured easily, and it can also supply a sufficient amount of processed liquid or water safely by using a relatively low voltage (i.e., a commercial power source of 200 V) and the supply of pasteurized liquid or water can be done with continuity.

In particular, depending on the liquid to be treated or processed, the pasteurizing effect can be increased easily by increasing the number of opening portions appropriately, across which are laid the electrodes, thereby obtaining a pasteurizing apparatus having a desired pasteurizing ability. The scope of the invention is by the appened claims rather than by the foregoing discussion of presently preferred embodiments.

What is claimed is:

1. A continuous liquid pasteurizing apparatus for pasteurizing liquid by continuously flowing the liquid within an electric field, comprising:

a body of electric insulator material forming a wall;

opening portions formed in said wall body for forming a part for passage of the liquid therethrough;

at least a pair of electrode wires laid across said opening portions; and means for applying an alternating current voltage across said pair of electrode wires.

2. A continuous liquid pasteurizing apparatus as described in claim 1, wherein said wall body is formed in a cylindrical shape.

3. A continuous liquid pasteurizing apparatus as described in claim 2, wherein said electrode wires are spirally wound around said cylindrical wall body, and an insulating film is formed on the cylindrical wall body except at the opening portions formed therein.

4. A continuous liquid pasteurizing apparatus as described in claim 2, further including pipes connected on side surfaces of said plural opening portions formed in said cylindrical wall body, thereby forming a liquid passage corresponding with each of said pipes and said opening portions.

5. A continuous liquid pasteurizing apparatus as described in claim 1 further including pipes connected on both side surfaces of each said opening portion thereby forming a liquid passage with said pipes and said opening portions.

6. A continuous liquid pasteurizing method using the continuous liquid pasteurizing apparatus as defined in claim 1, wherein the liquid is pasteurized by continuously flowing the liquid through said opening portions and under conditions of $2000 \geq H/d \geq 200$, where d (mm) is a distance between said electrode wires and H (volt) is a voltage applied thereacross.

7. A continuous liquid pasteurizing method as described in claim 6, wherein said liquid is pasteurized under conditions of $1600 \geq H/d \geq 400$.

8. A continuous liquid pasteurizing method as described in claim 6, wherein a frequency of power applied by said applying means is less than 50 kHz.

9. A continuous liquid pasteurizing method as described in claim 6, wherein said liquid is heated to at least a predetermined temperature by the voltage applied across the pair of electrode wires.

10. A continuous liquid pasteurizing method as described in claim 6, wherein said apparatus includes means for connecting said opening portions together in a single fluid passage, and the liquid is pasteurized multiple times as it continuously flows through said opening portions, respectively, in the fluid passage.

11. A continuous liquid pasteurizing method using the continuous liquid pasteurizing apparatus of claim 1, wherein the liquid is pasteurized by continuously flowing the liquid through said opening portions and by applying an alternating current voltage between said paid of electrode wires under conditions that the liquid is heated and $2000 \geq H/d \geq 200$, where d (mm) is a distance between said electrode wires and H (volt) is a voltage applied thereacross.

12. A continuous liquid pasteurizing method as described in claim 11, wherein said liquid is heated by heat generated by electric conduction through a resistance.

13. A continuous liquid pasteurizing method as described in claim 11, wherein said liquid is heated to at least a predetermined temperature by the alternating current voltage applied between the pair of electrode wires.

14. A continuous liquid pasteurizing method as described in claim 11, wherein a frequency of power applied by said applying means is less the 50 kHz.

15. A continuous liquid pasteurizing method as described in claim 11, wherein said apparatus includes means for connecting said opening portions together in a single fluid passage, and the liquid is pasteurized multiple times as it continuously flows through said opening portions, in the fluid passage.

16. A continuous liquid pasteurizing apparatus as described in claim 1, further including fluid communication joints on said wall body so as to fluid-tightly cover said opening portions, respectively, for forming fluid passages therewith.

17. A continuous liquid pasteurizing apparatus as described in claim 16, further including pipes connected to at least one of said wall body and said fluid communication joints as parts of said fluid communication passages.

18. A continuous liquid pasteurizing apparatus as described in claim 17, wherein said fluid communication passages are joined together as a single continuous fluid passage.

19. A continuous liquid pasteurizing method as described in claim 16, wherein said wall body is cylindrical and said fluid communication joints are provided on a holding ring disposed about said cylindrical wall body such that the joints align with said opening portions.

* * * * *

UNITED STATES PATENT AND TRADEMARK OFFICE
CERTIFICATE OF CORRECTION

PATENT NO : 6,056,884
DATED : 02 May 2000
INVENTOR(S): Kunihiko Uemura

It is certified that error appears in the above-identified patent and that said Letters Patent are hereby corrected as shown below:

On the cover page, in the "[57] ABSTRACT", 14th line, change "2000 ≤ H/d ≤ 200" to --2000 ≥ H/d ≥ 200--.

In the drawings, on FIG. 5, change "VFC" to --FVC--.

Column 1, line 11, delete "the";
    line 37, delete "once".

Column 2, line 31, delete the comma;
    line 32, delete the comma.

Column 3, line 33, change "an another" to --another--;
    line 47, change "bacterial" to --bacteria--.

Column 5, line 5, after "voltage" insert --power source--;
    line 14, delete "the";
    line 21, change "concentric" to --coaxial--;
    line 26, change "upper" to --flow--;
    line 27, change "lower" to --upper--;
    36th line, after "figures" insert a comma;
    40th line, after "cubic shape" insert a comma.

Column 6, line 67, change "and a" to --and--.

Column 7, line numbered between 55 and 56, begin a new paragraph with "The scope"; change "by the appened" to --indicated by the appended--;
    line 63 (claim 1, 4th line), change "electric" to --electrical--;
    line 64 (claim 1, 5th line), delete "for".

UNITED STATES PATENT AND TRADEMARK OFFICE
CERTIFICATE OF CORRECTION

PATENT NO : 6,056,884
DATED : 02 May 2000
INVENTOR(S): Kunihiko Uemura

It is certified that error appears in the above-identified patent and that said Letters Patent are hereby corrected as shown below:

Column 8, line 46 (claim 10, 5th line), delete the comma;
 line 47 (claim 10, 6th line), delete "respectively,";
 line numbered between 52 and 53 (claim 11, 5th line), change "paid" to --pair--;
 line 67 (claim 14, 3rd line), change "the" to --than--.

Column 9, line 5 (claim 15, 5th line), delete the comma;
 line 9 (claim 16, 3rd line), after "joints" insert --provided--.

Column 10, line 7 (claim 19, 1st line), change "method" to --apparatus--.

Signed and Sealed this

Third Day of April, 2001

*Attest:*

NICHOLAS P. GODICI

*Attesting Officer*   Acting Director of the United States Patent and Trademark Office